(12) United States Patent
Montero

(10) Patent No.: US 12,235,786 B2
(45) Date of Patent: Feb. 25, 2025

(54) LOADING FIRMWARE ONTO AN EXTERNAL EMBEDDED CONTROLLER (EC) OF A HETEROGENEOUS COMPUTING PLATFORM

(71) Applicant: Dell Products, L.P., Round Rock, TX (US)

(72) Inventor: Adolfo S. Montero, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 178 days.

(21) Appl. No.: 18/057,771

(22) Filed: Nov. 22, 2022

(65) Prior Publication Data
US 2024/0168909 A1    May 23, 2024

(51) Int. Cl.
*G06F 13/42* (2006.01)
*G06F 1/20* (2006.01)
*G06F 13/40* (2006.01)

(52) U.S. Cl.
CPC .......... *G06F 13/4221* (2013.01); *G06F 1/206* (2013.01); *G06F 13/4045* (2013.01)

(58) Field of Classification Search
None
See application file for complete search history.

(56) References Cited

U.S. PATENT DOCUMENTS

2021/0349842 A1* 11/2021 Sisterhen ................ G06F 13/28

\* cited by examiner

*Primary Examiner* — Scott C Sun
(74) *Attorney, Agent, or Firm* — Fogarty LLP

(57) ABSTRACT

Systems and methods for loading firmware onto an external embedded controller (EC) of a heterogenous computing platform. In an illustrative, non-limiting embodiment, an Information Handling System (IHS) may include: a heterogeneous computing platform having a Reduced Instruction Set Computer (RISC) processor and a Peripheral Component Interconnect Express (PCIe) controller coupled thereto, and an EC external to the heterogeneous computing platform and coupled to the PCIe controller, wherein the EC is configured to retrieve at least one of: firmware instructions, a configuration setting, or a table, from a PCIe device coupled to the PCIe controller.

18 Claims, 11 Drawing Sheets

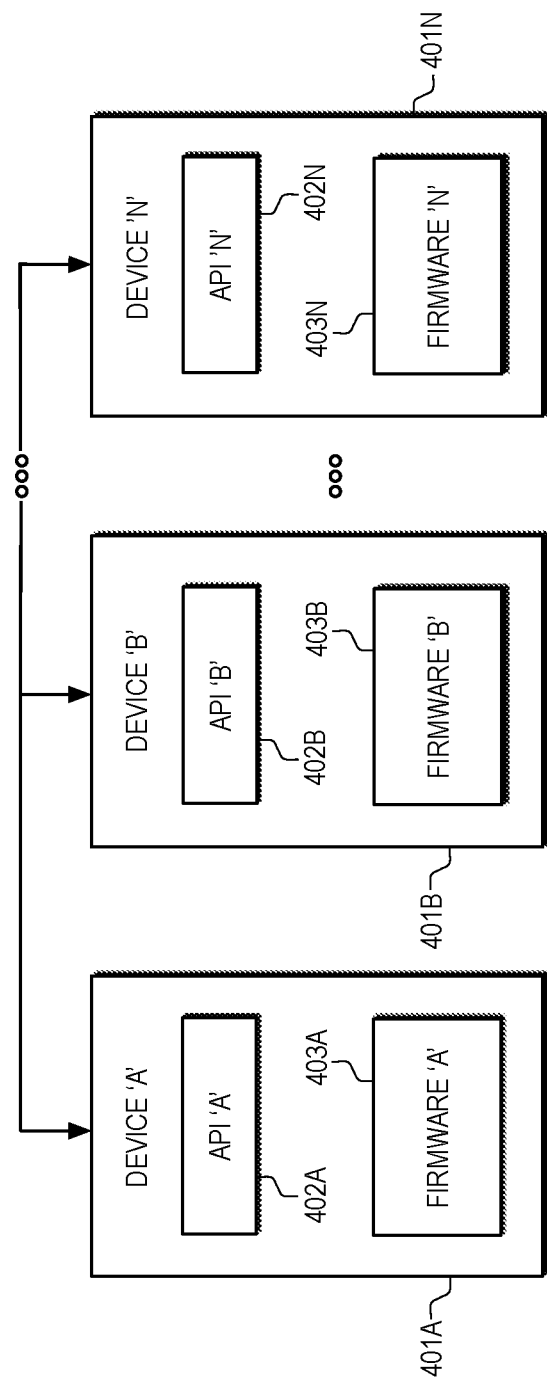

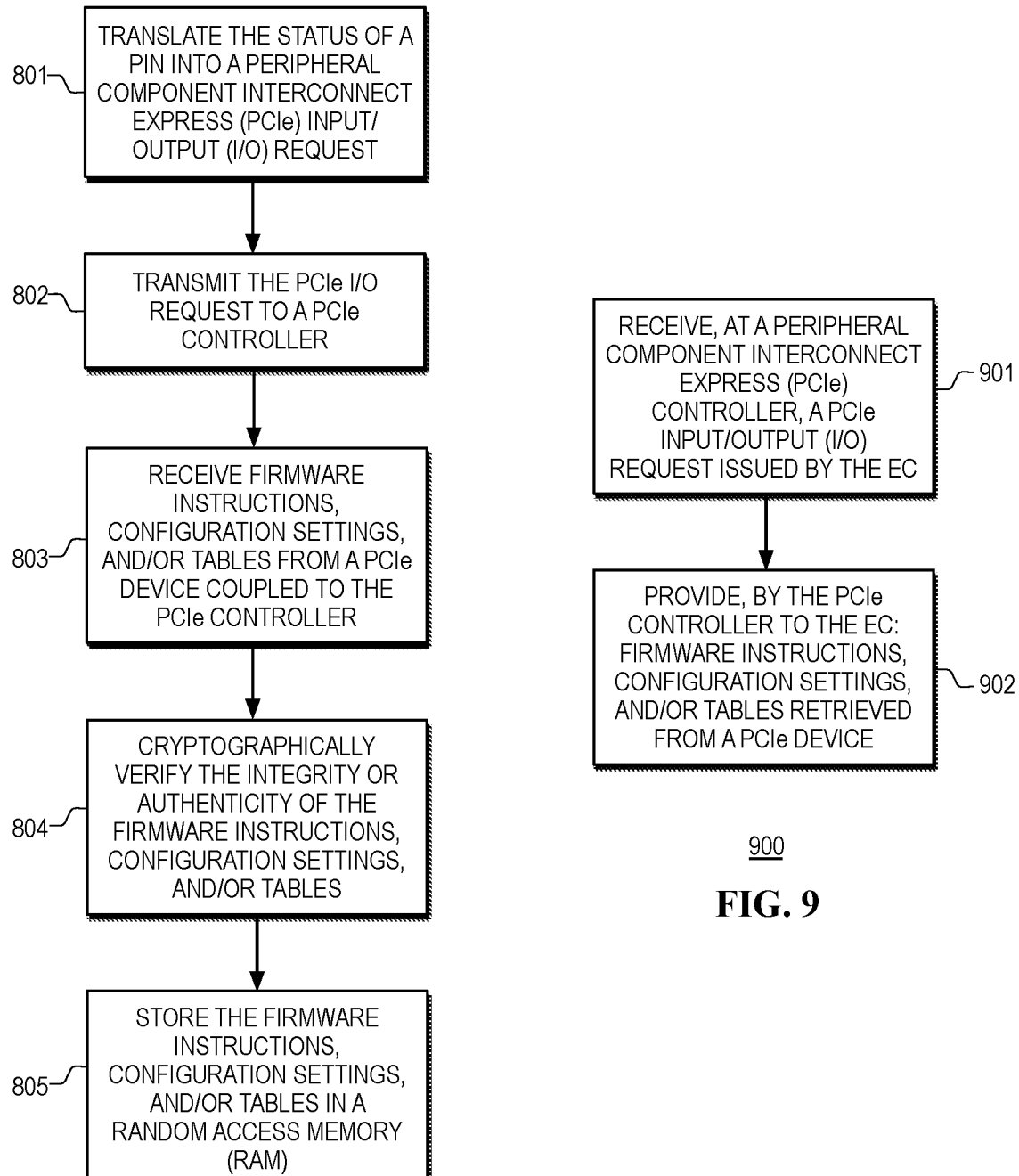

LOADING FIRMWARE ONTO AN EXTERNAL EMBEDDED CONTROLLER (EC) OF A HETEROGENEOUS COMPUTING PLATFORM

FIELD

This disclosure relates generally to Information Handling Systems (IHSs), and more specifically, to systems and methods for loading firmware onto an external embedded controller (EC) of a heterogenous computing platform.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Historically, IHSs with desktop and laptop form factors have had conventional Operating Systems (OSs) (e.g., WINDOWS, LINUX, MAC OS, etc.) executed on INTEL's or AMD's "x86"-type processors. Other types of processors, such as ARM processors, have been used in smartphones and tablet devices, which typically run thinner, simpler, or mobile OSs (e.g., ANDROID, iOS, WINDOWS MOBILE, etc.). More recently, however, IHS manufacturers have started producing full-fledged desktop and laptop IHSs equipped with ARM-based platforms. In fact, certain OSs (e.g., WINDOWS on ARM) have also been developed to provide users with a more quintessential OS experience on such platforms.

In that regard, the inventor hereof has recognized that devices known as embedded controllers (ECs) have played a central role in the overall operation of traditional x86-based platforms. An EC is a microcontroller mounted on an IHS's motherboard which is configured to manage several critical IHS processes, ranging from early power rail sequencing to power limits and thermal limits, and to provide low-level hardware controls via a myriad of general-purpose inputs/outputs (GPIOs). However, ARM-based platforms currently lack ECs.

Moreover, ARM-based platforms are not designed with any microcontroller that can be made operational from the start of the IHS's reset and throughout its various power states (other than G3 or "mechanical off" state). Rather, ARM-based platforms rely upon the use audio Digital Signal Processors (aDSPs) and/or keyboard controllers to perform very limited and rudimentary EC-like operations.

To address these, and other concerns, systems and methods described herein enable the integration of ECs into ARM-based and other heterogeneous computing platforms. Particularly, these systems and methods provide techniques for loading firmware onto an external EC of a heterogenous computing platform.

SUMMARY

Systems and methods for loading firmware onto an external embedded controller (EC) of a heterogenous computing platform are described. In an illustrative, non-limiting embodiment, an Information Handling System (IHS) may include: a heterogeneous computing platform having a Reduced Instruction Set Computer (RISC) processor and a Peripheral Component Interconnect Express (PCIe) controller coupled thereto, and an EC external to the heterogeneous computing platform and coupled to the PCIe controller, wherein the EC is configured to retrieve at least one of: firmware instructions, a configuration setting, or a table, from a PCIe device coupled to the PCIe controller.

The heterogeneous computing platform may include: a System-On-Chip (SoC), a Field-Programmable Gate Array (FPGA), or an Application-Specific Integrated Circuit (ASIC). Moreover, the RISC processor may include an Advanced RISC Machines (ARM) processor.

The EC may be coupled to the PCIe controller via an interconnect internal to the heterogeneous computing platform. The interconnect may include at least one of: an Advanced Microcontroller Bus Architecture (AMBA) bus, a QuickPath Interconnect (QPI) bus, or a HyperTransport (HT) bus. At least one of the EC or the PCIe controller may be coupled to the interconnect via a respective bridge, and a bridge between the EC and the interconnect may include an enhanced serial peripheral interface (eSPI)-to-interconnect bridge.

In some cases, the EC may include a boot Read Only Memory (ROM) having program instructions stored thereon that, upon execution by the EC, cause the EC to: translate a status of a pin coupled to the EC into a PCIe Input/Output (I/O) request; and transmit the PCIe I/O request to the PCIe controller.

The PCIe I/O request may identify the firmware instructions, configuration setting, or table. The PCIe I/O request may identify the PCIe device. The PCIe I/O request may identify a storage device class or a communications device class of the PCIe device.

The EC may be configured to cryptographically verify an integrity or authenticity of the firmware instructions, configuration setting, or table. Upon verification of integrity or authenticity of the firmware instructions, configuration setting, or table, the EC may be configured to store the firmware instructions, configuration setting, or table in a Random Access Memory (RAM) internal to the EC.

The EC may also be configured to: receive signals from a user input device, process a thermal measurement, control a cooling fan, throttle the RISC processor, perform an emergency shutdown of the IHS, control an indicator Light-Emitting Diode (LED), and process telemetry from a Battery Management Unit (BMU). Additionally, or alternatively, the EC may be configured to detect a posture of the IHS. Additionally, or alternatively, the EC may be configured to provide a Trusted Execution Environment (TEE) to the IHS. Additionally, or alternatively, the EC may be configured to enable remote management of the IHS over a network.

The EC may include a plurality of peripheral devices coupled to a processing core. The plurality of peripheral devices may include at least one of: an Inter-Integrated Circuit (I2C) bus controller, a Pulse Width Modulator (PWM), a tachometer (TACH), a General Purpose I/O (GPIO) controller, a serial peripheral interface (SPI) Flash, a fan controller, or an Analog-to-Digital Converter (ADC).

In another illustrative, non-limiting embodiment, an external EC may be coupled to a heterogeneous computing platform, where the external EC comprises a boot ROM having program instructions stored thereon that, upon execution by a processing core of the external EC, cause the external EC to: translate a status of a pin into a PCIe I/O request; transmit the PCIe I/O request to a PCIe controller; receive at least one of: firmware instructions, a configuration setting, or a table, from a PCIe device coupled to the PCIe controller; cryptographically verify an integrity or authenticity of the firmware instructions, configuration setting, or table; and store the firmware instructions, configuration setting, or table in a RAM.

In another illustrative, non-limiting embodiment, a method may include: receiving, at a PCIe controller of a heterogeneous computing platform, a PCIe I/O request issued by an external EC coupled to the heterogeneous computing platform, wherein the PCIe I/O identifies a PCIe device among a plurality of PCIe devices coupled to the PCIe controller; and providing, by the PCIe controller to the external EC, at least one of: firmware instructions, a configuration setting, or a table retrieved from the PCIe device in response to the PCIe I/O request.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 is a diagram illustrating an example of host OS-independent, autonomous inter-device communications in a heterogenous computing platform, according to some embodiments.

FIG. 8 is a flowchart of an example of a method for loading firmware from a Peripheral Component Interconnect Express (PCIe) device onto an external EC, according to some embodiments.

FIG. 9 is a flowchart of an example of a method for operating a PCIe controller to facilitate retrieval of firmware instructions from a PCIe device by an external EC, according to some embodiments.

DETAILED DESCRIPTION

Figure 1:
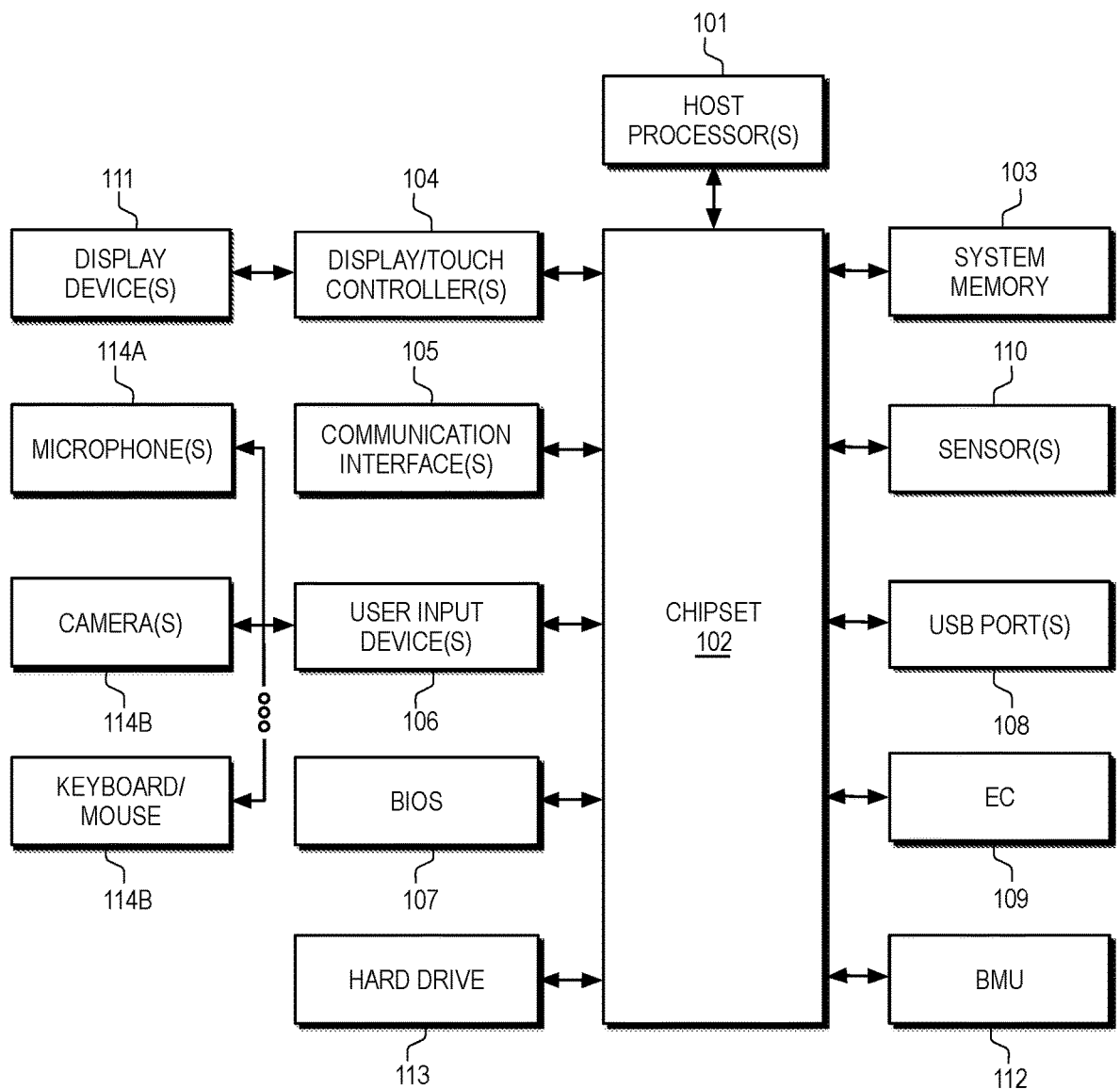
FIG. 1 is a diagram illustrating examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc.

The term "firmware," as used herein, refers to a class of program instructions that provides low-level control for a device's hardware. Generally, firmware enables basic functions of a device and/or provides hardware abstraction services to higher-level software, such as an OS. The term "firmware installation package," as used herein, refers to program instructions that, upon execution, deploy device drivers or services in an IHS or IHS component.

The term "device driver" or "driver," as used herein, refers to program instructions that operate or control a particular type of device. A driver provides a software interface to hardware devices, enabling an OS and other applications to access hardware functions without needing to know precise details about the hardware being used. When an application invokes a routine in a driver, the driver issues commands to a corresponding device. Once the device sends data back to the driver, the driver may invoke certain routines in the application. Generally, device drivers are hardware dependent and OS-specific.

The term "telemetry data," as used herein, refers to information resulting from in situ collection of measurements or other data by devices within a heterogenous computing platform, or any other IHS device or component, and its transmission (e.g., automatically) to a receiving entity, for example, for monitoring purposes. Typically, telemetry data may include, but is not limited to, measurements, metrics, and/or values which may be indicative of:

core utilization, memory utilization, network quality and utilization, battery utilization, peripheral or I/O device utilization, etc.

For instance, telemetry data may include, but is not limited to, measurements, metrics, logs, or other information related to: current or average utilization of IHS components, CPU/core loads, instant or average power consumption of IHS components, instant or average memory usage by IHS components, characteristics of a network or radio system (e.g., WiFi vs. 5G, bandwidth, latency, etc.), keyboard or mouse usage data, transaction times, latencies, response codes, errors, data produced by other sensors, etc.

FIG. 1 is a block diagram of components of IHS 100. As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as Ethernet, WiFi, BT, cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

In certain embodiments, chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensors 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load an OS for use by IHS 100. BIOS 107 provides an abstraction layer that allows the OS to interface with certain hardware components that are utilized by IHS 100. Via the hardware abstraction layer provided by BIOS 107, software stored in system memory 103 and executed by host processor(s) 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Figure 2:
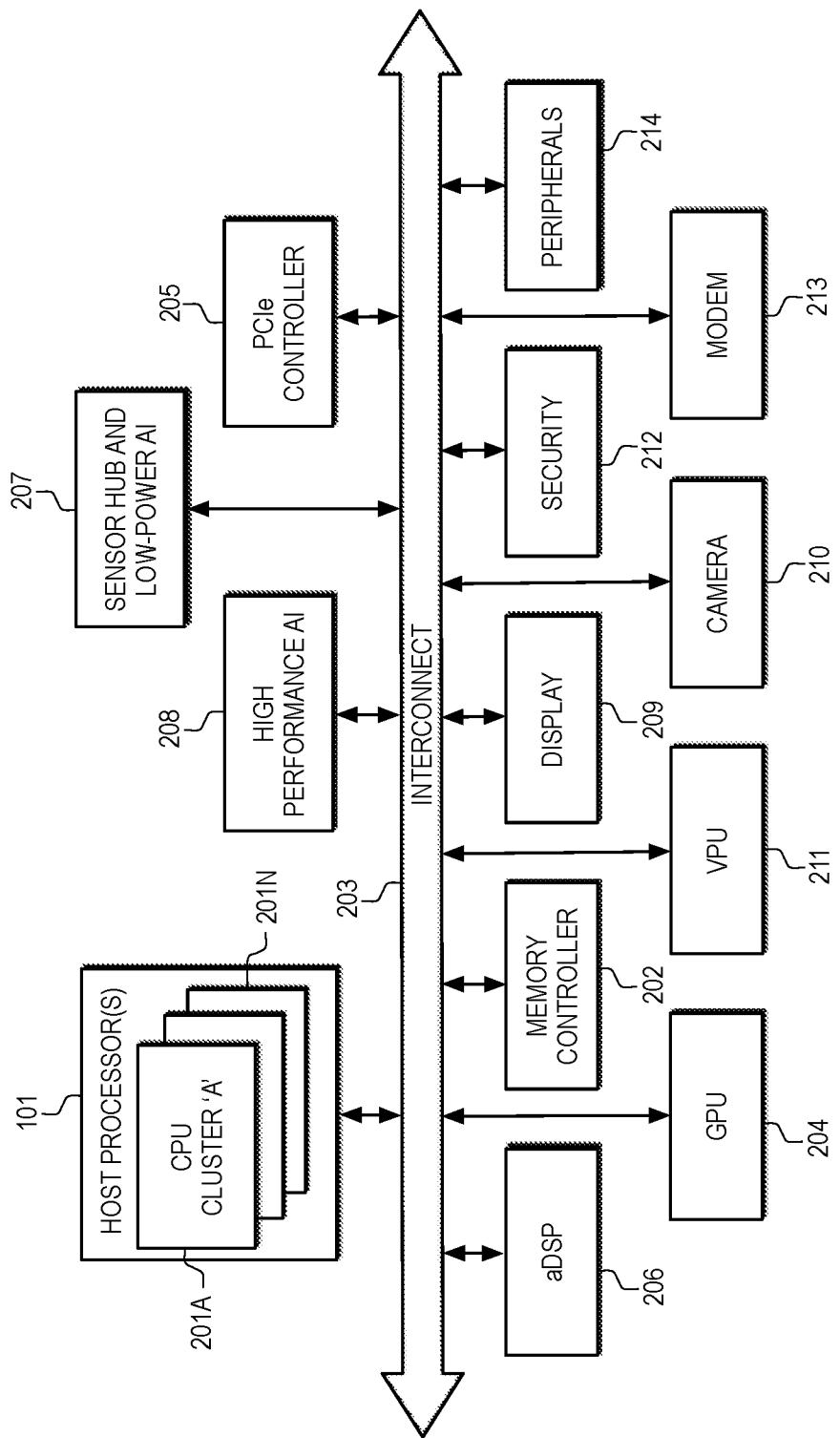
FIG. 2 is a diagram illustrating an example of a heterogenous computing platform, according to some embodiments.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion (Li-ion) or nickel metal hydride (NiMH) battery pack including one or more rechargeable batteries) and battery management unit (BMU) 112 that includes, for example, an analog front end (AFE), storage (e.g., non-volatile memory), and a microcontroller. In some cases, BMU 112 may be configured to collect and store information, and to provide that information to other IHS components, such as, for example devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and event occurrences.

Examples of BMU 112 events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

EC 109 (sometimes referred to as a Baseboard Management Controller or "BMC") handles certain IHS operations not ordinarily handled by host processor(s) 101. Examples of operations handled by EC 109 may include, but are not limited to: receiving and processing signals from a keyboard or touchpad, as well as other buttons and switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing the battery charger and the battery, enable remote diagnostics and remediation over network(s) 103, etc.

Unlike other devices in IHS 100, EC 109 may be made operational from the very start of each power reset, before other devices are fully running or powered on. As such, EC 109 may be responsible for interfacing with a power adapter to manage the power consumption of IHS 100. These operations may be utilized to determine the power status of IHS 100, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

In some cases, EC 109 may implement operations for detecting certain changes to the physical configuration or posture of IHS 100 and managing other devices in different configurations of IHS 100. For instance, when IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In this manner, EC 109 may identify any number of IHS postures, including, but not limited to: laptop, stand, tablet, or book. For example, when display(s) 111 of IHS 100 is open with respect to a horizontal keyboard portion, and the keyboard is facing up, EC 109 may determine IHS 100 to be in a laptop posture. When display(s) 111 of IHS 100 is open with respect to the horizontal keyboard portion, but the keyboard is facing down (e.g., its keys are against the top surface of a table), EC 109 may determine IHS 100 to be in a stand posture. When the back of display(s) 111 is closed against the back of the keyboard portion, EC 109 may determine IHS 100 to be in a tablet posture. When IHS 100 has two display(s) 111 open side-by-side, EC 109 may determine IHS 100 to be in a book posture. In some implementations, EC 109 may also determine if display(s) 111 of IHS 100 are in a landscape or portrait orientation.

In some implementations, EC 109 may be installed as a Trusted Execution Environment (TEE) component to the motherboard of IHS 100. Additionally, or alternatively, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. As such, EC 109 may validate the integrity of hardware and software components installed in IHS 100.

In addition, EC 109 may provide an Out-of-Band (OOB) channel that allows an information technology decision maker (ITDM) or original equipment manufacturer (OEM) to manage IHS 100's various settings and configurations.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components shown in FIG. 1 (e.g., chipset 102, display controller(s) 104, communication interface(s) 105, EC 109, etc.) may be replaced by discrete devices within heterogenous computing platform 200 (FIG. 2). As such, IHS 100 may assume different form factors including, but not limited to: servers, workstations, desktops, laptops, appliances, video game consoles, tablets, smartphones, etc.

FIG. 2 is a diagram illustrating an example of heterogenous computing platform 200. In various embodiments, platform 200 may be implemented in an SoC, FPGA, ASIC, or the like. Platform 200 includes a plurality of discrete or segregated devices, each device having a different set of processing capabilities suitable for handling a particular type of computational task. When each device in platform 200 executes only the types of computational tasks it was specifically designed to execute, the overall power consumption of platform 200 is reduced.

In various implementations, each device in platform 200 may include its own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in platform 200 may be accessible through a respective Application Programming Interface (API). Additionally, or alternatively, each device in platform 200 may execute its own OS. Additionally, or alternatively, one or more of these devices may be a virtual device.

In certain embodiments, at least one device in platform 200 may have updatable firmware which, upon installation, operates to change the performance, available features, settings, configuration options, API, drivers, and/or services provided by that device. For example, each update may be delivered to platform 200 as a system-wide firmware installation package having a plurality of firmware components, and each firmware component may be distributed to its respective device (or corresponding memory space). In some implementations, the latest system-wide firmware installation package received by platform 200 may be installed at every boot of IHS 100.

In the example of FIG. 2, platform 200 includes CPU clusters 201A-N as a particular implementation of host processor(s) 101 intended to perform general-purpose computing operations. Each of CPU clusters 201A-N may include a plurality or processing cores and a cache memory. In operation, CPU clusters 201A-N are available and accessible to the IHS's host OS 300 (e.g., WINDOWS on ARM), optimization application(s) 312 (FIG. 3), OS agent(s) 313, and other application(s) 314 executed by IHS 100.

CPU clusters 201A-N are coupled to memory controller 202 via internal interconnect fabric 203. Memory controller 202 is responsible for managing memory accesses for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 can communicate with each other and with a host OS executed by CPU clusters 201A-N.

GPU 204 is a device designed to produce graphical or visual content and to communicate that content to a monitor or display, where the content may be rendered.

PCIe controller or root complex 205 provide an entry point into any additional devices external to platform 200 that have a respective PCIe interface (e.g., graphics cards, USB controllers, SSD and NVMe drives, network drives, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc.

In operation, input and/or output audio streams may pass through and be processed by aDSP 206, which can send the processed audio to other devices on internal interconnect fabric 203 (e.g., CPU clusters 201A-N). aDSP 206 may also be configured to process one or more of platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.). To that end, aDSP 206 may be coupled to BMU 112.

Sensor hub and low-power AI device 207 is a very low power, always-on device designed to consolidate information received from other devices in platform 200, process any context and/or telemetry data streams, and provide that information to: (i) a host OS, (ii) other applications, and/or (ii) other devices in platform 200. For example, sensor hub and low-power AI device 207 may include general-purpose input/output (GPIOs) that provide Inter-Integrated Circuit (I²C), Serial Peripheral Interface (SPI), and/or serial interfaces to receive data from sensors (e.g., sensors 110, camera 210, peripherals 214, etc.).

Sensor hub and low-power AI device 207 may include an always-on, low-power core configured to execute small neural networks and specific applications, such as contextual awareness and other enhancements. In some embodiments, sensor hub and low-power AI device 207 may be configured to operate as an orchestrator device in charge of managing other devices, for example, based upon an ITDM/OEM policy or the like.

High-performance AI device 208 is a significantly more powerful processing device than sensor hub and low-power AI device 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TSU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks.

Display/graphics device 209 is designed to perform additional video enhancement operations. In operation, display/graphics device 209 may provide a video signal to an external display coupled to IHS 100 (e.g., display device(s) 111).

Camera device 210 includes an Image Signal Processor (ISP) configured to receive and process video frames captured by a camera coupled to platform 200 (e.g., in the visible and/or infrared spectrum).

Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

In some cases, devices 209-211 may be coupled to internal interconnect fabric 203 via a secondary interconnect fabric (not shown). A secondary interconnect fabric may include any bus suitable for inter-device and/or inter-bus communications within an SoC.

Security device 212 includes any suitable security device, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware root-of-trust (RoT) for heterogenous computing platform 200 and/or IHS 100.

Wireless controller, network adapter, and/or modem 213 is a device designed to enable all wired and wireless communications in any suitable frequency band (e.g., Bluetooth, WiFi, 5G, etc.), subject to AI-powered optimizations/customizations for improved speeds, reliability, and/or coverage.

Peripherals 214 may include any device coupled to platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some cases, devices 212 and 213 may be coupled to internal interconnect fabric 203 via the same secondary interconnect serving devices 209-211 (not shown). Additionally, or alternatively, devices 212-213 may be coupled to internal interconnect fabric 203 via another secondary interconnect.

In various embodiments, one or more devices of heterogeneous computing platform 200 (e.g., GPU 204, aDSP 206, sensor hub and low-power AI device 207, high-performance AI device 208, VPU 211, etc.) may be configured to execute one or more AI model(s), simulation(s), and/or inference(s).

Figure 3:
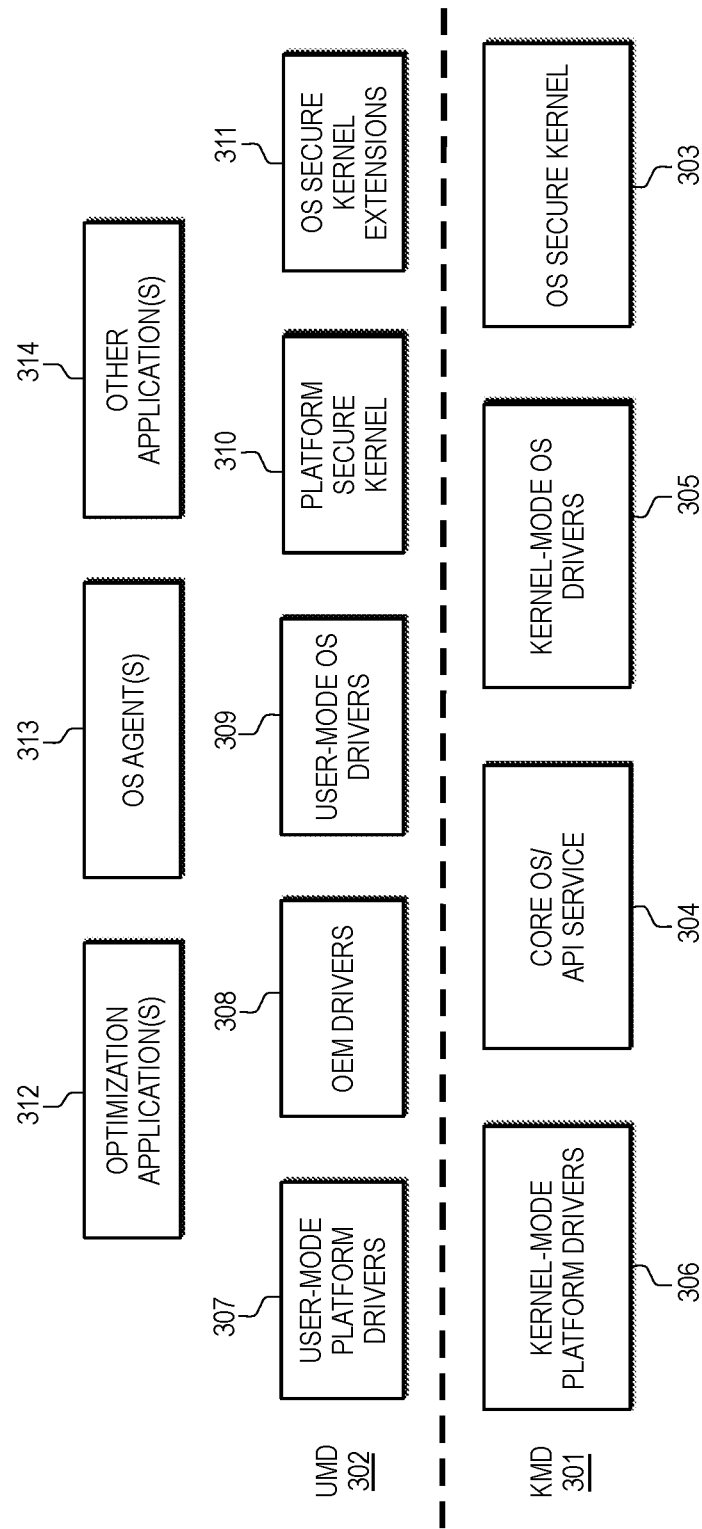
FIG. 3 is a diagram illustrating an example of a host Operating System (OS) executable by a heterogenous computing platform, according to some embodiments.

FIG. 3 is a diagram illustrating an example of host OS 300 executable by CPU clusters 201A-N of heterogenous computing platform 200. In some cases, host OS 300 may be implemented as WINDOWS on ARM. As shown, host OS 300's stack includes kernel mode drivers (KMD) in kernel space 301 and user mode drivers (UMD) in user space 302.

In kernel space 301, OS secure kernel 303 is responsible for secure operations (e.g., encryption, validation, etc.) within IHS 100. Core OS/API service 304 has direct access to IHS components such as, for example, heterogenous computing platform 200. OS drivers 305 include kernel mode drivers developed by the OS publisher or other developer. Platform drivers 306 include kernel mode drivers developed by the manufacturer of heterogenous computing platform 200, for example, for use with devices 201-214.

In user space 302, user-mode platform drivers and services 307 enable access to features provided by devices 201-214 through kernel-mode platform drivers 306. OEM drivers 308 enable features in OEM devices coupled to IHS 100, and user-mode OS drivers and services 309 enable access to OS features through kernel mode OS drivers 305. Platform secure kernel 310 includes protected user-mode portions of host OS 300 developed by the manufacturer of heterogenous computing platform 200, and OS secure kernel extensions 311 include extensions to protected user-mode portions of host OS 300 developed by the OS publisher or other developer.

OS agent(s) 313 may include an OS agent or client configured to communicate with service(s) provided by an ITDM/OEM service to establish an in-band management channel. Moreover, other application(s) 314 may include or be a part of any workload executable by heterogenous computing platform 200. For example, other application(s) 314 may include productivity, collaboration, streaming, multimedia, or gaming applications executable by host OS 300.

Optimization application(s) 312 may include any host OS 300—level application configured to intelligently optimize the performance of IHS 100 (e.g., DELL OPTIMIZER), for example, by using AI models to dynamically configure IHS 100's settings and/or to optimize the performance of other applications 314. In operation, optimization application(s) 312 may improve the productivity, performance, and user experience through system usage analysis and learning. For example, optimization application(s) 312 may be invoked, within host OS 300, to learn how application 314 is used. Optimization application(s) 312 may identify optimization opportunities, classify users, and automatically apply appropriate settings (e.g., storage, memory, and/or CPU) to improve application 314's performance.

At least one of applications 312-314 may be configured to utilize one or more devices, features, or services exposed, surfaced, enumerated, or otherwise made available by user-mode drivers 307-309, for example, through a Human Interface Device (HID) interface and/or an HID report provided by host OS 300, or the like.

In various implementations, host OS 300 may be configured to receive a firmware installation package or executable file containing at least one extension driver (e.g., a setup information or "INF" text file in a driver package) from an ITDM/OEM service via a management channel. The installation package may be processed by a UEFI UpdateCapsule process when distributed as part of an OS update, as a system-wide and/or device-specific firmware update, and/or it may be distributed by OEM update applications such as DELL COMMAND UPDATE, integrated with remote deployment and update management tools.

Firmware components of each extension driver may be loaded, attached, or extended onto user-mode platform drivers and services 307, and may be communicated by user-mode platform drivers and services 307 to respective devices of heterogenous computing platform 200 through kernel-mode platform drivers 306 for installation, update, or execution of such firmware components in those devices.

As such, the deployment of extension drivers by host OS 300 as OEM drivers 308 provides value-added features or services to user-mode platform drivers (e.g., base drivers) 307 and/or applications 312-314. Particularly, OEM drivers 308 may expose custom services and routines provided by any one of devices 201-214 upon execution of their corresponding firmware components.

FIG. 4 is a diagram illustrating an example of host OS-independent, autonomous inter-device communications 400 in heterogenous computing platform 200. Particularly, each of devices 401A-N may implement any of devices 201-214 of heterogenous computing platform 200.

Each of APIs 402A-N provides access to firmware 403A-N executed by a corresponding device 401A-N. In operation, each firmware component 403A-N may exchange data and commands directly with each other using APIs 402A-N. Through APIs 402A-N, one or more of devices 401A-N may be configured to enable, disable, or modify firmware services provided by other devices 403A-N. For example, in some embodiments, one or more of devices 401A-N may be designated as an orchestrator upon booting of platform 200.

In various embodiments, firmware services resulting from the execution of firmware 403A-N may be provided by their respective device 401A-N to other devices 401A-N within heterogeneous computing platform 200 autonomously and/or independently of the operation of host OS 300. Communications between executing firmware 403A-N and applications 312-314 may take place through OEM drivers 308. In some cases, executing firmware 403A-N may be identified by or exposed to host OS 300 and/or applications 312-314 as part of an HID report.

Firmware 403A-N and corresponding OEM drivers 308 may be installed, modified, updated, and/or removed from IHS 100 upon each installation of a firmware installation package for the entire heterogenous computing platform 200, for example, at each boot of IHS 100. For example, each firmware component 403A-N providing a respective firmware service may be delivered to a respective device 401A-N as an extension driver. Upon execution, these firmware services may provide additional controls over the management, deployment, customization, and/or configuration of IHS 100 to an ITDM/OEM that are independent of updates to host OS 300 and/or applications 312-314.

In other embodiments, any given one of devices 401A-N may be rebooted or reset independently of the other devices to perform a local installation, update, or modification of that device's firmware services without having to reboot the entire heterogenous computing platform 200 and/or IHS 100. Additionally, or alternatively, one or more of devices 401A-N may have its firmware service at least partially installed or updated without rebooting or resetting the device.

As discussed above, systems and methods described herein may integrate EC 109 into heterogenous computing platform 200 of IHS 100. For example, in the implementations shown in FIGS. 5A and 5B, components of EC 109 (e.g., core, peripheral devices, etc.) may be fully or partially integrated into heterogeneous computing platform 200. In another implementation shown in FIG. 5C, however, EC 109 may be completely external to platform 200 but coupled to a bridge integrated therein via a high-speed interface (e.g., enhanced SPI or "eSPI") to provide or maintain the EC's ability to access the SoC's internal interconnect fabric. In any of these scenarios, EC 109 may be configured to operate as an orchestrator instead of (or along with) sensor hub and low-power AI device 207.

Figure 5A:
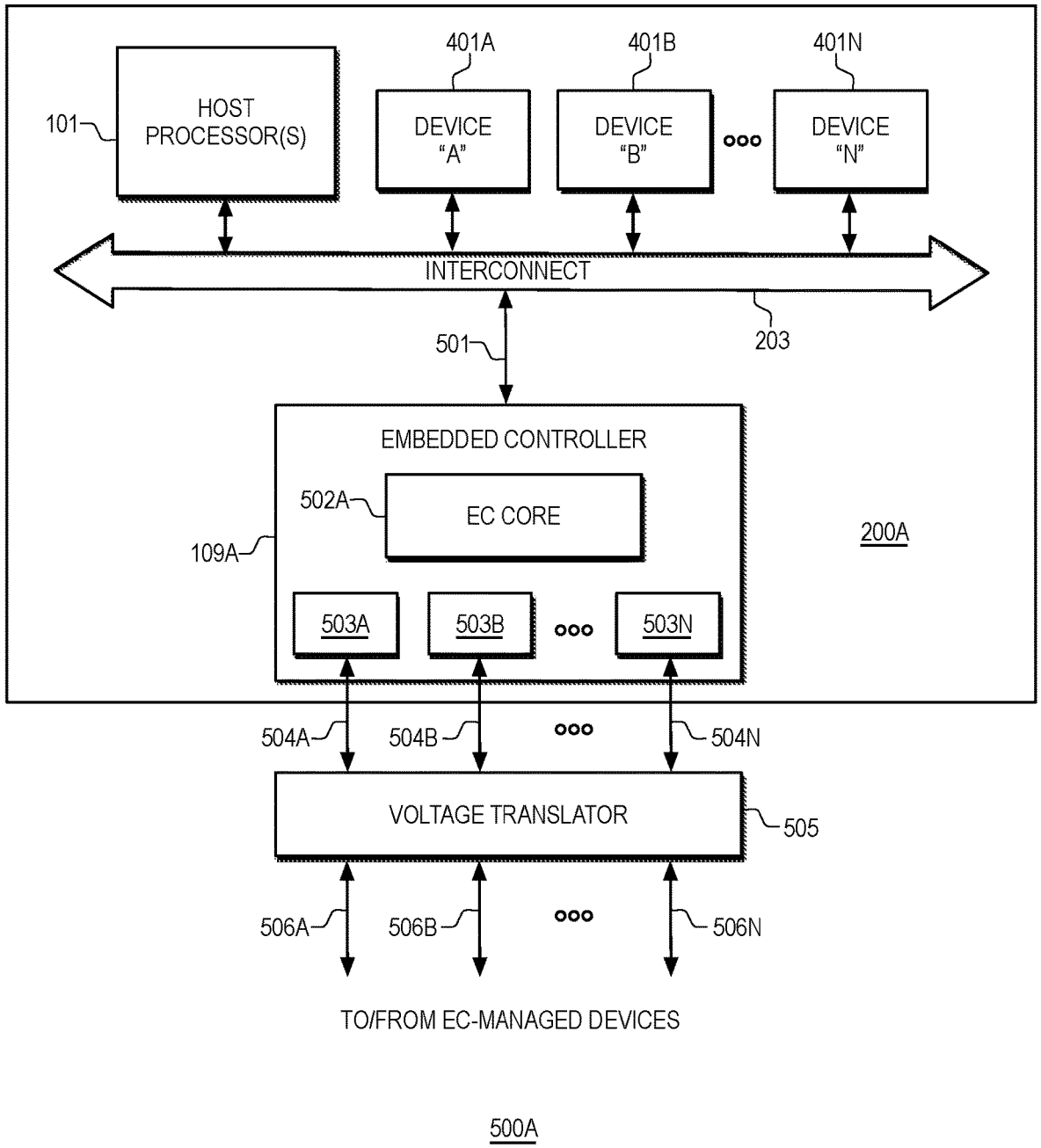
FIGS. 5A-C are diagrams illustrating examples of different degrees of integration of an embedded controller (EC) in a heterogenous computing platform, according to some embodiments.

Particularly, FIG. 5A is a diagram illustrating example 500A of EC 109A integrated into heterogenous computing platform 200A. In this embodiment, EC 109A is fully integrated within the SoC and it is coupled to internal interconnect fabric 203 via internal bus or interconnect access 501. EC 109A may include EC processing core 502A (e.g., another ARM core) and a plurality of peripheral devices 503A-N.

Examples of peripheral devices 503A-N include, but are not limited to: an Inter-Integrated Circuit (I2C) bus controller, a Pulse Width Modulator (PWM), a tachometer (TACH), a General Purpose I/O (GPIO) controller, a serial peripheral interface (SPI) Flash, a fan controller, an Analog-to-Digital Converter (ADC), etc.

Each of peripheral devices 503A-N may be coupled to a corresponding pin or terminal of SoC 200A. The operating voltage of heterogenous computing platform 200A is typically lower than the operating voltage of external EC-managed devices (e.g., cooling fans, etc.), which means that, ordinarily, peripheral devices 503A-N would not be able to communicate with them. To address this problem, voltage translator 505 may be coupled to peripheral devices 503A-N through low-voltage connections 504A-N (via corresponding pins of the SoC) and to EC-managed devices (not shown) via high-voltage connections 506A-N.

In operation, voltage translator 505 may be configured to increase the voltage of signals transmitted from peripheral devices 503A-N to EC-managed devices (e.g., from 1.2 or 1.8 V to 3.3 V). Voltage translator 505 may also be configured to reduce the voltage of other signals transmitted from EC-managed devices to peripheral devices 503A-N (e.g., from 3.3 V to 1.8 or 1.2 V).

Figure 5B:
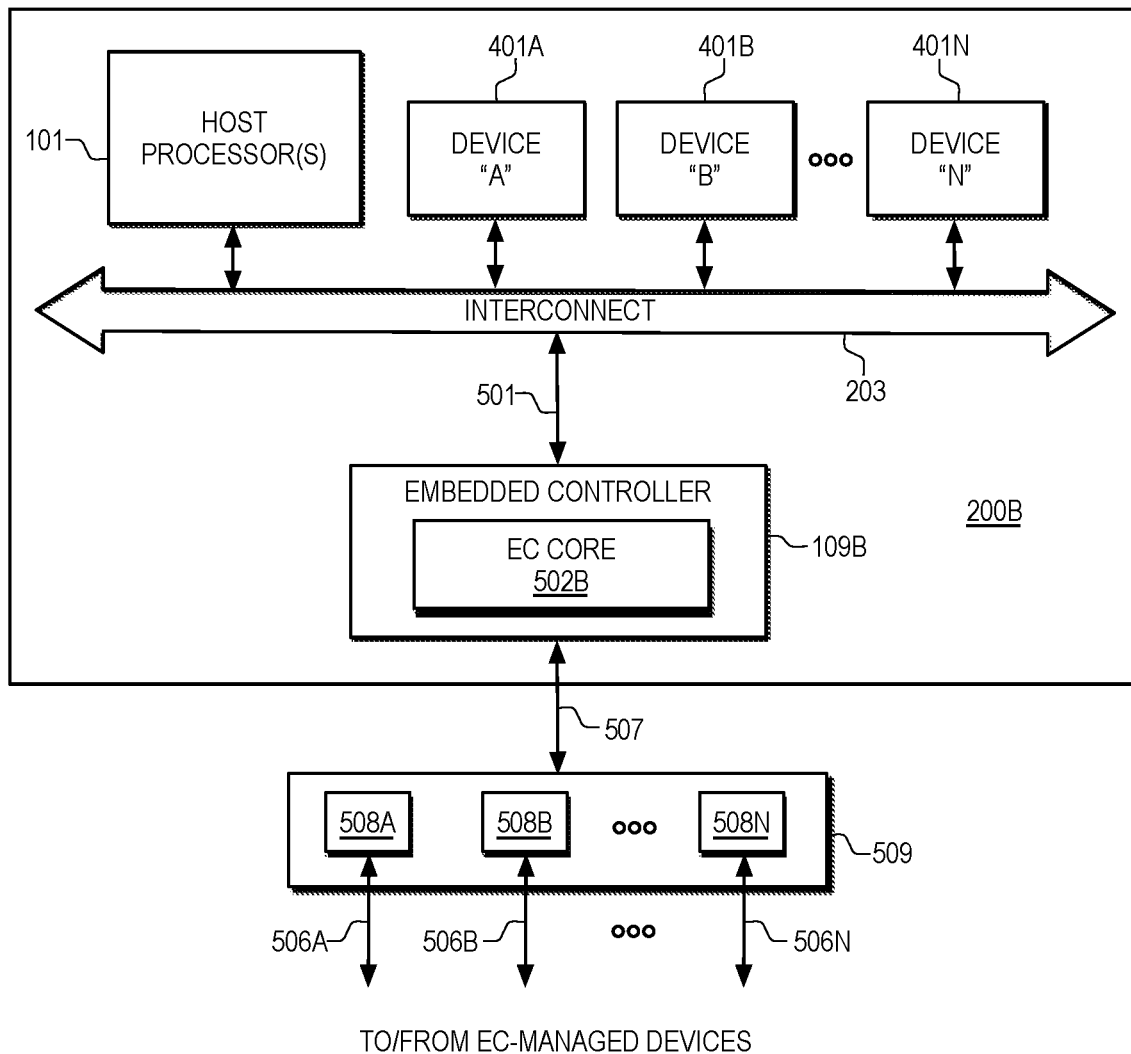

FIG. 5B shows a diagram of example 500B of EC 109B partially integrated into heterogenous computing platform 200B. In contrast with example 500A, here only EC core 502B is integrated into the SoC and peripheral devices 508A-N (e.g., similar to peripheral devices 503A-N, but with different operating voltages) are provided in separate package 509 mounted on the IHS motherboard, apart from the SoC.

To communicate with peripheral devices 503A-N, EC core 502B may be coupled to package 509 via connection or bus 507, such as a SPI bus (e.g., 1.2 V, 100 MHz). In this manner, example 500B reduces the number of pins (e.g., ~100 fewer pins or more) on the SoC that would otherwise be required to enable all EC operations. Moreover, because peripheral devices 503A-N are external to EC 109B, they may interface with EC-managed devices directly over 506A-N using their native voltages (e.g., 3.3 V), and therefore voltage translator 505 of example 500A is not required.

As such, in examples 500A and 500B, EC 109A/B may power up as soon as SoC 200 comes out of reset. In some cases, the MCU 500A/B may own a local SRAM program store that is loaded once when coming out of reset, and which does not rely on an external DRAM to be initialized and able to run. In other implementations, such internal memory may be Flash-based.

Accordingly, EC 109A/B may have access to all the SoC 200's internal resources, and especially early access to the SoC 200's GPIOs for early hardware bring-up control points, such as power rails or other activities otherwise typically reserved for a Power Management Controller (PMIC). Moreover, EC 109A/B may have access to the SoC 200's internal hardware interconnect bus 203 to enable special or enhanced operations not currently possible with x86 architectures.

Figure 5C:
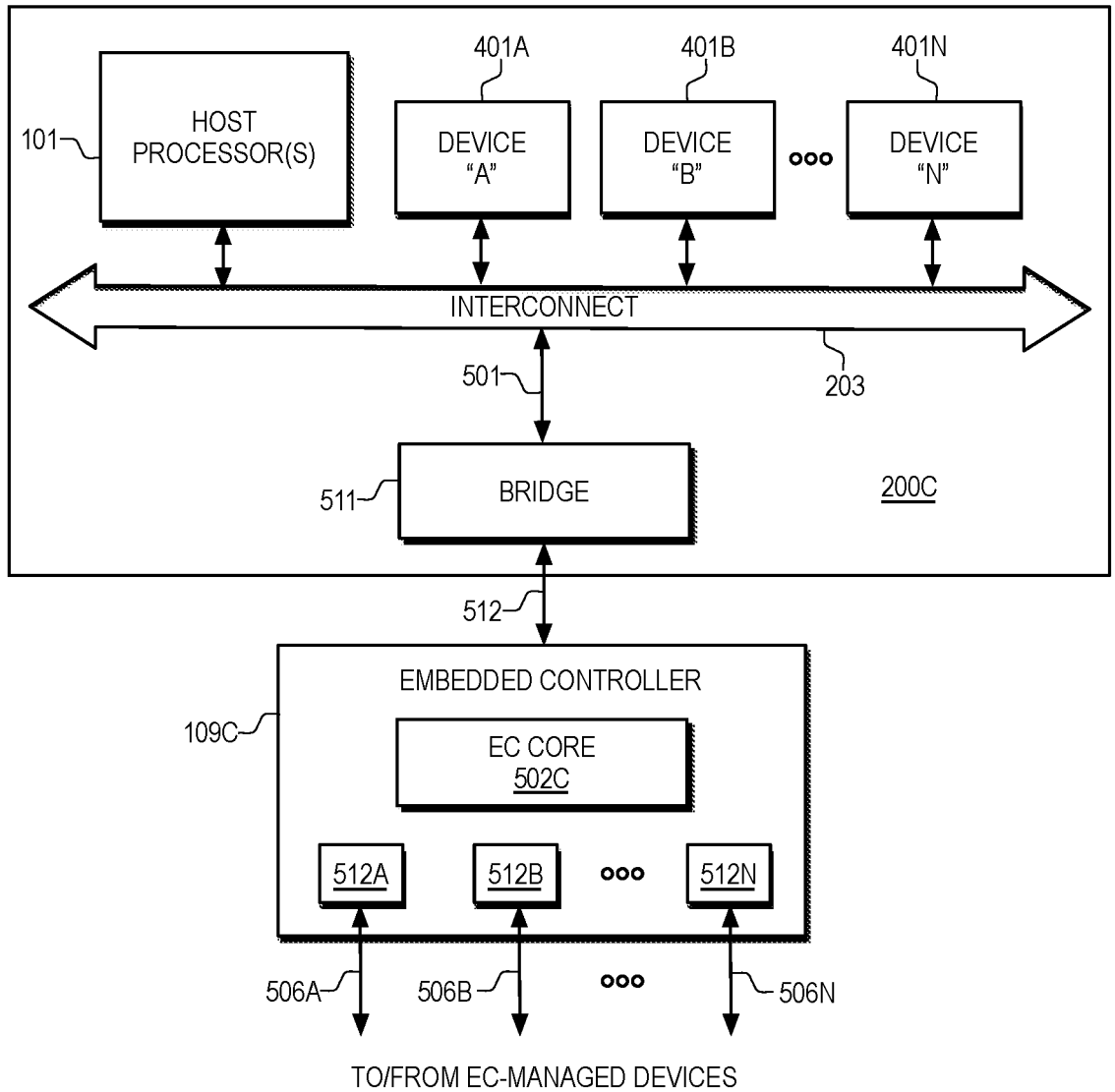

FIG. 5C shows a diagram of example 500C of EC 109C externally disposed with respect to heterogenous computing platform 200C. In contrast with examples 500A/B, here both EC core 502C and peripheral devices 512A-N are provided in a discrete package mounted on the IHS motherboard. The SoC includes bridge 511 coupled to internal interconnect fabric 203 via internal bus or interconnect access 510, and EC 109C is coupled to bridge 511 via high-speed bus or interface 512, which may be an eSPI interface or the like (such as a derivative of PCIe type protocols at the hardware level).

In example 500C, the deployment of eSPI bus 512 may prevent bottlenecks in the EC's operations that would result if other types of interfaces (e.g., $I^2C$) were used. For instance, eSPI bus 512 between the SoC and EC 109C may enable the EC 109C to run multiple parallel features concurrently. Also, eSPI bus 512 provide the capability to virtualize GPIOs using "virtual wires," whereby EC 109C may access the GPIO status over eSPI instead of going through the physical GPIO hardware layer.

Furthermore, high-speed interface 512 may provide EC 109C with full connectivity to the internal SoC fabric. For example, in a scenario where host processor(s) 101 fails to boot, eSPI bus 512 may allow EC 109C to access and/or run most or all of devices 401A-N (e.g., PCIe bus, USB controllers, network controllers, graphics controllers, system memory, etc.) directly.

As such, example 500C may be used, for example, to provide pre-boot, on-demand services based upon EC 109C; which is not currently possible with existing SoCs (or in x86 architectures). EC 109C is generally verifiable to be a trusted device, thus once that trust is established, having access to key SoC resources no longer presents attack vector concerns. For example, in various implementations, EC 109C may have sideband file access to hard drive 113, an SSD, or an NVME coupled to platform 200.

A possible benefit or advantage of enabling external EC 109C over internal ECs 109A/B is the ability to operate GPIOs at different voltage levels than the SoC. Another possible benefit or advantage of external EC 109C versus internal ECs 109A/B includes reducing the GPIO pin count of the SoC, especially in implementations where the SoC's footprint is already saturated with GPIOs and a designer is forced to grow the size of the SoC to accommodate potentially hundreds of additional GPIO pinouts.

Figure 6:
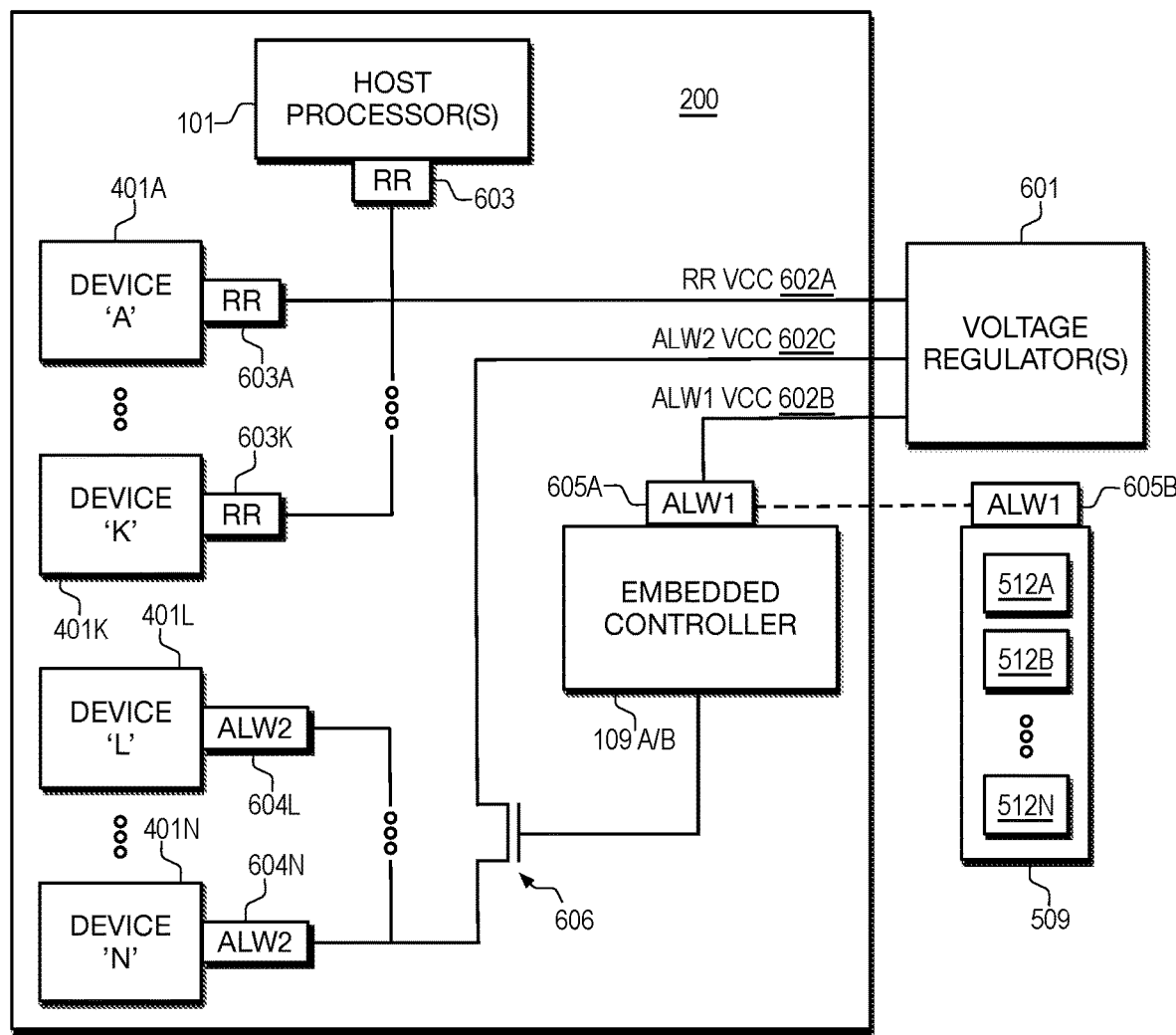
FIG. 6 is a diagram illustrating an example of a voltage supply circuit suitable for integrating an EC into a heterogenous computing platform, according to some embodiments.

FIG. 6 is a diagram illustrating an example of voltage supply circuit 600 suitable for integrating EC 109 into heterogenous computing platform 200. In this embodiment, each of host processor(s) 101 and devices 401A-K of platform 200 includes a respective run rail (RR) input 6030 and 603A-K configured to receive the same voltage output RR VCC 602A from external voltage regulator 601.

Distinctly from host processor(s) 101 and devices 401A-K, at least partially integrated EC 109A/B includes an always-on (ALW1) input 605A configured to receive a separate voltage output ALW1 VCC 602B from external voltage regulator 601. In implementations where package 509 is deployed containing EC peripherals (FIG. 5B), package 509 may also include its own ALW1 input 605B coupled to ALW1 input 605A.

In various embodiments, one or more devices within platform 200, such as devices 401L-N, may include always-on inputs ALW2 604L-N configured to receive yet another distinct voltage output ALW2 VCC 602C from external voltage regulator 601. For example, devices 401F-H may include an OOB processor, an OOB network controller, or the like, which may be configured to enable OOB communications between EC 109A/B and a remote ITDM/OEM service autonomously or independently of the operation of host processor(s) 101, devices 401A-K, and/or host OS 300, for example, by running its own Transmission Control Protocol/Internet Protocol or "TCP/IP" and low-level networking stacks (e.g., with clock speeds typically 10× greater than EC 109A/B).

Moreover, EC 109A/B may be coupled to the gate of switch 606 (e.g., a field-effect transistor or "FET") disposed along the connection between ALW2 VCC 602C and inputs ALW2 604L-N. In those cases, EC 109A/B may be configured to control switch 606 to turn devices 401L-N on and off by selectively or programmatically coupling and decoupling ALW2 604L-N to voltage output ALW2 VCC 602C. Additionally, or alternatively, other switches may be used (not shown) to enable EC 109A/B to control the operation of one or more of devices 401A-K.

In operation, RR VCC 602A is provided to processor(s) 101 and devices 401A-N when the SoC is in "run mode," which means host OS 300 is already booting up or executing. In contrast, ALW1 VCC 602B and ALW2 VCC 602 are always provided by voltage regulator 601 so long as IHS 100 is receiving AC/DC power, for example, in response to a power-on or reset event. As a result, EC 109A/B (as well as devices 401L-N) may be operational before host processor(s) 101, devices 401A-K, and/or host OS 300 are up and running.

As such, in various embodiments, systems and methods described herein may provide an EC with access to an internal SoC fabric, whether in a fully internal, partially internal/external, or fully external implementation (e.g., via eSPI). These systems and methods may also provide voltage segregation factor and power sequencing, as well as various possible architectural variations on GPIO handling.

In various embodiments, EC 109 may play such a central role in the overall operation of IHS 100 that it must be a trusted component running trusted firmware. To address these, and other concerns, systems and methods described herein enable external EC 109C coupled to heterogeneous computing platform 200C to employ the capabilities of PCIe controller or root complex 205 to securely retrieve and/or verify/authenticate its own EC image or firmware instructions from a PCIe device (e.g., a local SSD drive, a remote server, etc.). Additionally, or alternatively, EC 109C may retrieve configuration settings and/or tables from a PCIe device.

For example, in some cases, external EC 109C may have PCIe access tunneling through SOC 200C and into PCIe SSD or NVMe storage drives and it may retrieve EC firmware from those storage drives. Other PCIe access models may load the EC firmware image from a trusted network connection and/or from the cloud or Internet. As such, new PCIe connectivity and resources can provide alternatives to the otherwise conventional process of loading EC firmware from a flash device (e.g., SPI flash).

EC 109C may validate the PCIe-acquired EC firmware via using asymmetric cryptography (e.g., Elliptic Curve Cryptography or "ECC"), such that the firmware is signed with a private key on the build server and verified by IHS 100 with a matching public key on EC 109C (e.g., stored in its boot ROM firmware). Validating the EC firmware cryptographically before running it, as the very first device in platform 200C to run at the system level, alleviates potential security problems and enables EC 109C to act as the root of trust for IHS 100.

Figure 7A:
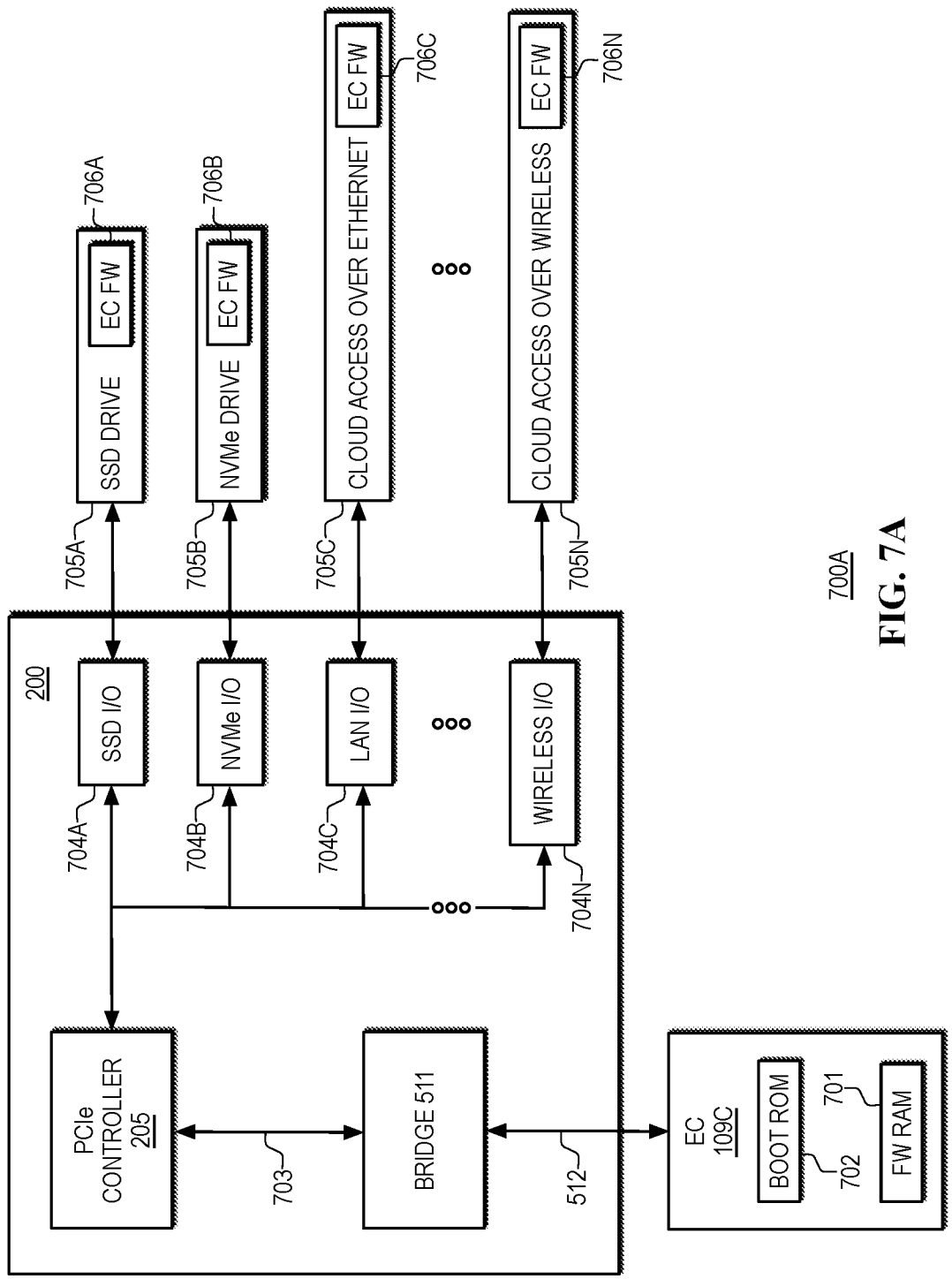
FIGS. 7A and 7B are diagrams of examples of systems for loading firmware onto an external EC of a heterogenous computing platform, according to some embodiments.
Figure 7B:
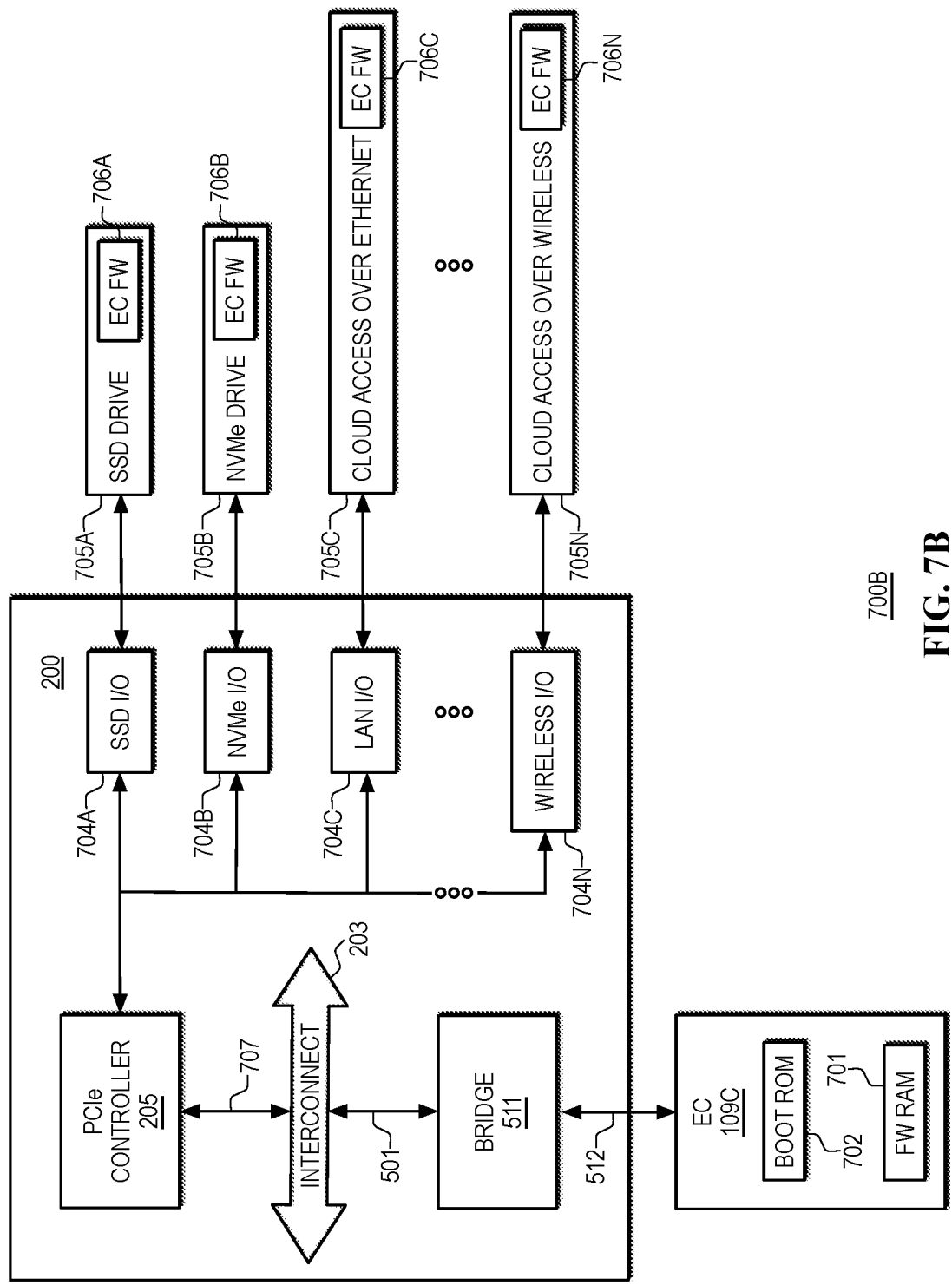

In that regard, FIGS. 7A and 7B are diagrams of examples of systems 700A and 700B for loading firmware onto external EC 109C of heterogenous computing platform 200C. As illustrated, EC 109C includes firmware RAM 701 and boot ROM 702 (in addition to EC core 502C), and it is coupled to PCIe controller 205 of platform 200C.

In system 700A of FIG. 7A, EC 109C is coupled to bridge 511 (e.g., an eSPI 512-to-Interconnect bridge), and bridge 511 is coupled to PCIe controller 205 via connection 703. In some cases, however, connection 703 may include an interconnect access. In system 700B of FIG. 7B, bridge 511 is coupled to interconnect 203 via interconnect access 501. On the side of PCIe controller 205, connection 707 may include a PCIe bus, a PCIe-to-interconnect bridge, and another access to interconnect 203.

PCIe controller 205 includes dedicated PCIe I/O connections 704A-N to a plurality of PCIe devices 705A-N, respectively. For example, PCIe devices 705A-N may include storage class devices, such as SSD drive 705A and NVMe drive 705B, or network/communication class devices, such as "cloud access over Ethernet" 705C and "cloud access over wireless" 705D. Each of PCIe devices 705A-N may be a source of EC firmware instructions, configuration settings, or tables 706A-N for EC 109C.

FIG. 8 is a flowchart of an example of method 800 for loading firmware from any of PCIe devices 705A-N onto external EC 109C via PCIe controller 205. In various embodiments, method 800 may be performed by EC core 502C of EC 109C upon execution of boot instructions stored in boot ROM 702.

At 801, EC 109C translates a status of an SoC pin (previously set using a "pin-strapping" technique) into a corresponding PCIe I/O request or command to retrieve EC firmware instructions, configuration settings, or tables 706A-N from one or more of PCIe devices 705A-N. For example, SoC 200C may include a set of one or more EC firmware source selection pin(s). At 802, EC 109C transmits the PCIe I/O request to PCIe controller 205.

In some cases, the PCIe I/O request may indicate at least one of PCIe devices 705A-N as the source of EC firmware instructions, configuration settings, or tables 706A-N. Additionally, or alternatively, the PCIe I/O request may identify a selected set of EC firmware instructions, configuration settings, or tables 706A-N.

At 803, EC 109C receives EC firmware instructions, configuration settings, or tables 706A-N from PCIe devices 705A-N. At 804, EC 109C cryptographically verifies the integrity or authenticity of EC firmware instructions, configuration settings, or tables 706A-N. For example, each of PCIe devices 705A-N may be provisioned with its own digital certificate.

An example of a digital certificate may include an X.509 certificate, which uses the X.509 public key infrastructure (PKI) standard to verify that a public key belongs to the user, computer, component, or service identity identified within the certificate. In some implementations, such a certificate may include a version (which X.509 version applies to the certificate), a serial number (the issuer or entity creating the certificate assigns it a serial number that distinguishes it from other certificates), algorithm information (the algorithm used by the issuer to sign the certificate), the name of the entity issuing the certificate (e.g., a certificate authority), a validity period of the certificate (start/end date and time), the name of the entity the certificate is issued to, public key information, and various extensions.

Using a signed digital certificate, EC 109C may validate, verify, or authenticate EC firmware instructions, configuration settings, or tables 706A-N for use in IHS 100 and/or by the current user of IHS 100. In some cases, EC 109C may validate, verify, or authenticate EC firmware instructions, configuration settings, or tables 706A-N using security device 212.

At 805, in response to a successful validation, verification, or authentication, EC 109C stores EC firmware instructions, configuration settings, or tables 706A-N in EC RAM 701 to be used during the current boot of IHS 100, in the next boot of IHS 100, and/or as part of rebootless firmware updates. Otherwise, EC 109C may reject EC firmware instructions, configuration settings, or tables 706A-N.

FIG. 9 is a flowchart of an example of method 900 for operating PCIe controller 205 to facilitate retrieval of EC firmware instructions, configuration settings, or tables 706A-N from PCIe devices 705A-N by external EC 109C. At 901, PCIe controller 205 receives a PCIe I/O request issued by EC 109C.

The PCIe I/O request may identify a selected PCIe device among a PCIe devices 705A-N. Additionally, or alternatively, the PCIe I/O request may identify EC firmware instructions, configuration settings, or tables 706A-N.

Still at 901, PCIe controller 205 transmits the PCIe I/O request and receives EC firmware instructions, configuration settings, or tables 706A-N from the selected PCIe device. Then, at 902, PCIe controller 205 sends the EC firmware instructions, configuration settings, or tables 706A-N to EC 109C.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
    a heterogeneous computing platform having a Reduced Instruction Set Computer (RISC) processor and a Peripheral Component Interconnect Express (PCIe) controller coupled thereto; and an embedded controller (EC) external to the heterogeneous computing platform and coupled to the PCIe controller, wherein the EC is configured to retrieve at least one of: firmware instructions, a configuration setting, or a table, from a PCIe device coupled to the PCIe controller.

2. The IHS of claim 1, wherein the heterogeneous computing platform comprises: a System-On-Chip (SoC), a Field-Programmable Gate Array (FPGA), or an Application-Specific Integrated Circuit (ASIC).

3. The IHS of claim 1, wherein the RISC processor comprises an Advanced RISC Machines (ARM) processor.

4. The IHS of claim 1, wherein the EC is coupled to the PCIe controller via an interconnect internal to the heterogeneous computing platform.

5. The IHS of claim 4, wherein the interconnect comprises at least one of: an Advanced Microcontroller Bus Architecture (AMBA) bus, a QuickPath Interconnect (QPI) bus, or a HyperTransport (HT) bus.

6. The IHS of claim 4, wherein at least one of the EC or the PCIe controller are coupled to the interconnect via a respective bridge, and wherein a bridge between the EC and the interconnect comprises an enhanced serial peripheral interface (eSPI)-to-interconnect bridge.

7. The IHS of claim 1, wherein the EC comprises a boot Read Only Memory (ROM) having program instructions stored thereon that, upon execution by the EC, cause the EC to:
translate a status of a pin coupled to the EC into a PCIe Input/Output (I/O) request; and
transmit the PCIe I/O request to the PCIe controller.

8. The IHS of claim 7, wherein the PCIe I/O request identifies the firmware instructions, configuration setting, or table.

9. The IHS of claim 7, wherein the PCIe I/O request identifies the PCIe device.

10. The IHS of claim 9, wherein the PCIe I/O request identifies a storage device class or a communications device class of the PCIe device.

11. The IHS of claim 1, wherein the EC is configured to cryptographically verify an integrity or authenticity of the firmware instructions, configuration setting, or table.

12. The IHS of claim 1, wherein upon verification of integrity or authenticity of the firmware instructions, configuration setting, or table, the EC is configured to store the firmware instructions, configuration setting, or table in a Random Access Memory (RAM) internal to the EC.

13. The IHS of claim 1, wherein the EC is configured to: receive signals from a user input device, process a thermal measurement, control a cooling fan, throttle the RISC processor, perform an emergency shutdown of the IHS, control an indicator Light-Emitting Diode (LED), and process telemetry from a Battery Management Unit (BMU).

14. The IHS of claim 1, wherein the EC is configured to detect a posture of the IHS.

15. The IHS of claim 1, wherein the EC is configured to provide a Trusted Execution Environment (TEE) to the IHS.

16. The IHS of claim 1, wherein the EC is configured to enable remote management of the IHS over a network.

17. The IHS of claim 1, wherein the EC comprises a plurality of peripheral devices coupled to a processing core.

18. The IHS of claim 17, wherein the plurality of peripheral devices comprises at least one of: an Inter-Integrated Circuit (I2C) bus controller, a Pulse Width Modulator (PWM), a tachometer (TACH), a General Purpose I/O (GPIO) controller, a serial peripheral interface (SPI) Flash, a fan controller, or an Analog-to-Digital Converter (ADC).

* * * * *